United States Patent
Rohde et al.

(10) Patent No.: US 10,787,946 B2
(45) Date of Patent: Sep. 29, 2020

(54) HEATED DOSING MIXER

(71) Applicant: Faurecia Emissions Control Technologies, USA, LLC, Columbus, IN (US)

(72) Inventors: John G. Rohde, Columbus, IN (US); Madhuri Gandikota, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 80 days.

(21) Appl. No.: 16/135,211

(22) Filed: Sep. 19, 2018

(65) Prior Publication Data
US 2020/0088081 A1    Mar. 19, 2020

(51) Int. Cl.
F01N 3/20 (2006.01)
F01N 3/28 (2006.01)

(52) U.S. Cl.
CPC .......... F01N 3/2892 (2013.01); F01N 3/208 (2013.01); F01N 3/2066 (2013.01); F01N 2240/16 (2013.01); F01N 2240/20 (2013.01); F01N 2610/02 (2013.01); F01N 2610/146 (2013.01)

(58) Field of Classification Search
CPC ...... F01N 3/2066; F01N 3/208; F01N 3/2892; F01N 2240/16; F01N 2240/20; F01N 2610/02; F01N 2610/146
See application file for complete search history.

(56) References Cited

U.S. PATENT DOCUMENTS

| | | |
|---|---|---|
| 1,462,219 A | 7/1923 | Wagner |
| 3,150,922 A | 9/1964 | Ashley |
| 3,524,631 A | 8/1970 | Mare |
| 4,033,123 A | 7/1977 | Masaki et al. |
| 4,054,418 A | 10/1977 | Miller et al. |
| 4,094,934 A | 6/1978 | Tuckey et al. |
| 4,420,933 A | 12/1983 | Kajitani et al. |
| 4,459,805 A | 7/1984 | Kamiya et al. |
| 4,538,413 A | 9/1985 | Shinzawa et al. |
| 4,576,617 A | 3/1986 | Renevot |
| 4,662,172 A | 5/1987 | Shinzawa et al. |
| 4,912,920 A | 4/1990 | Hirabayashi |
| 5,020,991 A | 6/1991 | Schaale et al. |
| 5,605,042 A | 2/1997 | Stutzenberger |
| 5,606,856 A | 3/1997 | Linder et al. |
| 5,648,022 A | 7/1997 | Gohara et al. |
| 5,826,428 A | 10/1998 | Blaschke |
| 6,192,677 B1 | 2/2001 | Tost |

(Continued)

FOREIGN PATENT DOCUMENTS

| | | |
|---|---|---|
| CN | 101732992 A | 6/2010 |
| CN | 202012386 U | 10/2011 |

(Continued)

Primary Examiner — Audrey K Bradley
(74) Attorney, Agent, or Firm — Carlson, Gaskey & Olds, P.C.

(57) ABSTRACT

A vehicle exhaust system includes a mixer housing that has a doser opening and defines an internal mixing chamber. A doser injects fluid into the mixer housing through the doser opening. A flow passage has an inlet end positioned adjacent the doser opening and an outlet end open to the mixing chamber. At least one heating device associated with the flow passage.

22 Claims, 4 Drawing Sheets

(56) References Cited

U.S. PATENT DOCUMENTS

| | | |
|---|---|---|
| 6,382,600 B1 | 5/2002 | Mahr |
| 6,401,455 B1 | 6/2002 | Mathes et al. |
| 6,444,177 B1 | 9/2002 | Muller et al. |
| 6,449,947 B1 | 9/2002 | Liu et al. |
| 6,460,340 B1 | 10/2002 | Chauvette et al. |
| 6,513,323 B1 | 2/2003 | Weigl et al. |
| 6,516,610 B2 | 2/2003 | Hodgson |
| 6,527,865 B1 | 3/2003 | Sajoto et al. |
| 6,539,708 B1 | 4/2003 | Hofmann et al. |
| 6,637,196 B1 | 10/2003 | Tost |
| 6,722,123 B2 | 4/2004 | Liu et al. |
| 6,755,014 B2 | 6/2004 | Kawai et al. |
| 7,059,118 B2 | 6/2006 | Ripper et al. |
| 7,509,799 B2 | 3/2009 | Amou et al. |
| 7,730,721 B2 | 6/2010 | Kimura et al. |
| 7,784,273 B2 | 8/2010 | Kanaya et al. |
| 7,814,745 B2 | 10/2010 | Levin et al. |
| 7,849,676 B2 | 12/2010 | Witte-Merl |
| 7,895,828 B2 | 3/2011 | Satou |
| 7,963,104 B2 | 6/2011 | Girard et al. |
| 7,980,063 B2 | 7/2011 | Cooke |
| 7,992,379 B2 | 8/2011 | Suzuki et al. |
| 8,006,487 B2 | 8/2011 | Gaiser |
| 8,033,101 B2 | 10/2011 | Amon et al. |
| 8,079,211 B2 | 12/2011 | Levin et al. |
| 8,097,055 B2 | 1/2012 | Staley et al. |
| 8,114,364 B2 | 2/2012 | Harinath et al. |
| 8,173,088 B2 | 5/2012 | Makartchouk et al. |
| 8,216,537 B2 | 7/2012 | Kouvetakis et al. |
| 8,240,137 B2 | 8/2012 | Liu et al. |
| 8,250,859 B2 | 8/2012 | Torisaka et al. |
| 8,371,114 B2 | 2/2013 | Hayashi et al. |
| 8,371,256 B2 | 2/2013 | Durrett et al. |
| 8,393,834 B2 | 3/2013 | Brugman |
| 8,397,492 B2 | 3/2013 | Kowada |
| 8,425,851 B2 | 4/2013 | Kimura |
| 8,438,839 B2 | 5/2013 | Floyd et al. |
| 8,499,739 B2 | 8/2013 | Cox et al. |
| 8,539,761 B2 | 9/2013 | Lebas et al. |
| 8,607,550 B2 | 12/2013 | Tangemann et al. |
| 8,622,316 B2 | 1/2014 | Haeberer et al. |
| 8,646,258 B2 | 2/2014 | Vanvolsem et al. |
| 8,661,792 B2 | 3/2014 | Greber et al. |
| 8,677,738 B2 | 3/2014 | Floyd et al. |
| 8,700,246 B2 | 4/2014 | Kurikuma et al. |
| 8,726,643 B2 | 5/2014 | Way et al. |
| 8,756,921 B2 | 6/2014 | Troxler et al. |
| 8,776,509 B2 | 7/2014 | Wikaryasz et al. |
| 8,893,481 B2 | 11/2014 | Katou et al. |
| 8,899,026 B2 | 12/2014 | Loman et al. |
| 8,915,069 B2 | 12/2014 | Loman |
| 8,916,101 B2 | 12/2014 | Iljima et al. |
| 8,955,312 B2 | 2/2015 | Watahiki et al. |
| 8,966,884 B2 | 3/2015 | Kruse et al. |
| 8,991,160 B2 | 3/2015 | Katou et al. |
| 9,003,775 B2 | 4/2015 | Wright et al. |
| 9,003,782 B2 | 4/2015 | Werni et al. |
| 9,057,312 B2 | 6/2015 | Munnannur et al. |
| 9,062,582 B2 | 6/2015 | Loman et al. |
| 9,062,589 B2 | 6/2015 | Katou et al. |
| 9,103,258 B2 | 8/2015 | Norling et al. |
| 9,140,163 B2 | 9/2015 | Loman |
| 9,145,810 B2 | 9/2015 | Bisaiji et al. |
| 9,188,039 B2 | 11/2015 | Nagel et al. |
| 9,194,267 B2 | 11/2015 | Loman |
| 9,266,075 B2 | 2/2016 | Chapman et al. |
| 9,289,724 B2 | 3/2016 | Stanavich et al. |
| 9,308,495 B2 | 4/2016 | Kimura |
| 9,341,100 B2 | 5/2016 | Petry |
| 9,346,017 B2 | 5/2016 | Greber |
| 9,364,790 B2 | 6/2016 | Sampath et al. |
| 9,394,821 B2 | 7/2016 | Assalve et al. |
| 9,410,464 B2 | 8/2016 | Hicks et al. |
| 9,422,844 B2 | 8/2016 | Suzuki et al. |
| 9,441,522 B2 | 9/2016 | Crandell et al. |
| 9,464,546 B2 | 10/2016 | Perrot et al. |
| 9,494,067 B2 | 11/2016 | Niaz |
| 9,518,496 B2 | 12/2016 | Hill et al. |
| 9,587,543 B2 | 3/2017 | Haverkamp et al. |
| 9,670,811 B2 | 6/2017 | De Rudder et al. |
| 9,714,598 B2 | 7/2017 | Alano et al. |
| 9,719,397 B2 | 8/2017 | Alano et al. |
| 9,726,064 B2 | 8/2017 | Alano |
| 9,810,127 B2 | 11/2017 | Kloeckner et al. |
| 9,849,424 B2 | 12/2017 | Davidson et al. |
| 9,890,682 B2 | 2/2018 | Clayton, Jr. |
| 9,920,676 B2 | 3/2018 | Freeman et al. |
| 2001/0018826 A1 | 9/2001 | Rusch |
| 2003/0110763 A1 | 6/2003 | Pawson et al. |
| 2003/0226412 A1 | 12/2003 | Rumminger et al. |
| 2004/0047232 A1 | 3/2004 | Terentiev |
| 2005/0150211 A1 | 7/2005 | Crawley et al. |
| 2006/0070374 A1 | 4/2006 | Gaiser et al. |
| 2006/0218902 A1 | 10/2006 | Arellano et al. |
| 2007/0092143 A1 | 4/2007 | Higgins |
| 2007/0092413 A1 | 4/2007 | Hirata et al. |
| 2007/0163241 A1 | 7/2007 | Meingast et al. |
| 2007/0175204 A1 | 8/2007 | Shirai et al. |
| 2007/0193252 A1 | 8/2007 | McKinley et al. |
| 2008/0011777 A1 | 1/2008 | Cooke |
| 2008/0022663 A1 | 1/2008 | Dodge |
| 2008/0022670 A1 | 1/2008 | Ichikawa |
| 2008/0092526 A1 | 4/2008 | Kunkel et al. |
| 2008/0141667 A1 | 6/2008 | Winter et al. |
| 2008/0256931 A1 | 10/2008 | Kawakita et al. |
| 2008/0282687 A1 | 11/2008 | Park et al. |
| 2008/0295497 A1 | 12/2008 | Kornherr et al. |
| 2009/0012066 A1 | 1/2009 | Izumo et al. |
| 2009/0031714 A1 | 2/2009 | Jochumsen et al. |
| 2009/0044524 A1 | 2/2009 | Fujino |
| 2009/0064668 A1 | 3/2009 | Herrick et al. |
| 2009/0084094 A1 | 4/2009 | Goss et al. |
| 2009/0107126 A1 | 4/2009 | Bugos et al. |
| 2009/0120066 A1 | 5/2009 | VanderGriend et al. |
| 2009/0127511 A1 | 5/2009 | Bruck et al. |
| 2009/0249769 A1 | 10/2009 | Flanagan et al. |
| 2010/0000203 A1 | 1/2010 | Kowada |
| 2010/0005790 A1 | 1/2010 | Zhang |
| 2010/0005791 A1 | 1/2010 | Ranganathan et al. |
| 2010/0071355 A1 | 3/2010 | Brown et al. |
| 2010/0101222 A1 | 4/2010 | Oesterle et al. |
| 2010/0146950 A1 | 6/2010 | Hayashi et al. |
| 2010/0186393 A1 | 7/2010 | Kowada |
| 2010/0196225 A1 | 8/2010 | Harinath et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0257849 A1 | 10/2010 | Kowada |
| 2010/0263359 A1 | 10/2010 | Haverkamp et al. |
| 2010/0300080 A1 | 12/2010 | Peters et al. |
| 2010/0307138 A1 | 12/2010 | Chen |
| 2010/0319329 A1 | 12/2010 | Khadiya |
| 2011/0036082 A1 | 2/2011 | Collinot |
| 2011/0041488 A1 | 2/2011 | Bisaiji et al. |
| 2011/0061374 A1 | 3/2011 | Noritake |
| 2011/0079003 A1 | 4/2011 | Sun et al. |
| 2011/0107743 A1 | 5/2011 | Ranganathan et al. |
| 2011/0107749 A1 | 5/2011 | Tsujimoto et al. |
| 2011/0113759 A1 | 5/2011 | Tilinski et al. |
| 2011/0113764 A1 | 5/2011 | Salanta et al. |
| 2011/0126529 A1 | 6/2011 | Park |
| 2011/0131958 A1 | 6/2011 | Adelman et al. |
| 2011/0162347 A1 | 7/2011 | Katare et al. |
| 2011/0167810 A1 | 7/2011 | Lebas et al. |
| 2011/0239631 A1 | 10/2011 | Bui et al. |
| 2011/0257849 A1 | 10/2011 | Alberius et al. |
| 2011/0274590 A1 | 11/2011 | Floyd et al. |
| 2012/0174561 A1 | 7/2012 | Troxler et al. |
| 2012/0204541 A1 | 8/2012 | Li et al. |
| 2012/0216513 A1 | 8/2012 | Greber et al. |
| 2012/0322012 A1 | 12/2012 | Tsumagari et al. |
| 2012/0324872 A1 | 12/2012 | Jaruvatee et al. |
| 2013/0164181 A1 | 6/2013 | Ilijima et al. |
| 2013/0164182 A1 | 6/2013 | Ilijima et al. |

(56) References Cited

U.S. PATENT DOCUMENTS

| | | |
|---|---|---|
| 2013/0164183 A1 | 6/2013 | Iijima et al. |
| 2013/0170973 A1 | 7/2013 | Staskowiak et al. |
| 2013/0216442 A1 | 8/2013 | Brunel et al. |
| 2013/0239546 A1 | 9/2013 | Levin et al. |
| 2013/0263575 A1 | 10/2013 | Sun |
| 2013/0269325 A1 | 10/2013 | Hadden et al. |
| 2013/0291519 A1 | 11/2013 | Patel et al. |
| 2013/0303365 A1 | 11/2013 | Yin et al. |
| 2014/0093439 A1 | 4/2014 | De Rudder et al. |
| 2014/0230418 A1 | 8/2014 | Perrot et al. |
| 2014/0318112 A1 | 10/2014 | Solbrig et al. |
| 2014/0325967 A1 | 11/2014 | Kimura |
| 2014/0334987 A1 | 11/2014 | Stanavich et al. |
| 2014/0334988 A1 | 11/2014 | Stanavich et al. |
| 2015/0004083 A1 | 1/2015 | Makartchouk et al. |
| 2015/0040547 A1 | 2/2015 | Brockman et al. |
| 2015/0047329 A1 | 2/2015 | Way et al. |
| 2015/0071826 A1 | 3/2015 | Sampath et al. |
| 2015/0101313 A1 | 4/2015 | Mitchell et al. |
| 2015/0152766 A1 | 6/2015 | Brunel |
| 2015/0240689 A1 | 8/2015 | Guilbaud et al. |
| 2015/0267596 A1* | 9/2015 | Tobben ................ F01N 3/0253 60/274 |
| 2015/0290585 A1 | 10/2015 | Nagata et al. |
| 2015/0315943 A1* | 11/2015 | Gschwind ............. B01F 5/0616 422/180 |
| 2015/0354432 A1 | 12/2015 | Gehrlein et al. |
| 2015/0361853 A1 | 12/2015 | Nagata et al. |
| 2016/0032808 A1 | 2/2016 | Kobe et al. |
| 2016/0084133 A1 | 3/2016 | Sampath et al. |
| 2016/0115847 A1 | 4/2016 | Chapman et al. |
| 2016/0129397 A1 | 5/2016 | Lee et al. |
| 2016/0131007 A1 | 5/2016 | Kauderer et al. |
| 2016/0138454 A1 | 5/2016 | Alano et al. |
| 2016/0184783 A1 | 6/2016 | Tyni et al. |
| 2016/0201539 A1 | 7/2016 | Tongu et al. |
| 2016/0215673 A1 | 7/2016 | Noren, IV et al. |
| 2016/0251990 A1 | 9/2016 | Dimpelfeld et al. |
| 2016/0319720 A1 | 11/2016 | Alano |
| 2016/0332126 A1 | 11/2016 | Nande et al. |
| 2016/0348557 A1 | 12/2016 | Dalimonte et al. |
| 2016/0361694 A1 | 12/2016 | Brandl et al. |
| 2017/0066012 A1 | 3/2017 | Hornback |
| 2017/0082007 A1 | 3/2017 | Alano et al. |
| 2017/0107877 A1 | 4/2017 | Johnson et al. |
| 2017/0167344 A1 | 6/2017 | Alano et al. |
| 2017/0175606 A1 | 6/2017 | Peace |
| 2018/0023446 A1 | 1/2018 | Dimpelfeld |
| 2018/0080360 A1* | 3/2018 | Kurpejovic ........... F01N 3/2066 |
| 2018/0142597 A1 | 5/2018 | Riepshoff et al. |
| 2018/0156092 A1 | 6/2018 | Inclan et al. |
| 2018/0171849 A1 | 6/2018 | Saupe et al. |

FOREIGN PATENT DOCUMENTS

| | | |
|---|---|---|
| CN | 202360191 U | 8/2012 |
| CN | 202467984 U | 10/2012 |
| CN | 203452874 U | 2/2014 |
| CN | 205164443 U | 4/2016 |
| CN | 106014560 A | 10/2016 |
| CN | 205627632 U | 10/2016 |
| DE | 4417238 A1 | 9/1994 |
| DE | 10241697 A1 | 4/2003 |
| DE | 10312212 A1 | 11/2003 |
| DE | 102005061145 A1 | 6/2007 |
| DE | 102007034316 A1 | 1/2009 |
| DE | 102008023585 A1 | 1/2009 |
| DE | 102007051510 A1 | 4/2009 |
| DE | 202008001022 U1 | 6/2009 |
| DE | 102008008563 A1 | 8/2009 |
| DE | 102007052262 A1 | 2/2010 |
| DE | 102008040476 A1 | 2/2010 |
| DE | 102008041486 A1 | 2/2010 |
| DE | 102008052757 A1 | 4/2010 |
| DE | 102008059602 A1 | 6/2010 |
| DE | 102009046280 A1 | 5/2011 |
| DE | 102011008895 A1 | 7/2012 |
| DE | 102011075594 A1 | 11/2012 |
| DE | 102011077156 A1 | 12/2012 |
| DE | 102012209689 A1 | 12/2013 |
| DE | 102013012909 A1 | 2/2015 |
| DE | 102014104224 A1 | 10/2015 |
| EP | 0268026 A1 | 5/1988 |
| EP | 0956895 A1 | 11/1999 |
| EP | 1314864 A1 | 5/2003 |
| EP | 1596044 A1 | 11/2005 |
| EP | 2221459 A1 | 8/2010 |
| EP | 2405109 A2 | 1/2012 |
| EP | 2465602 A2 | 6/2012 |
| EP | 2492465 A1 | 8/2012 |
| EP | 2551481 A1 | 1/2013 |
| EP | 2687286 A1 | 1/2014 |
| EP | 2860369 A1 | 4/2015 |
| EP | 2860370 A1 | 4/2015 |
| FR | 2873157 A1 | 1/2006 |
| FR | 2897646 A3 | 8/2007 |
| FR | 2910533 A1 | 6/2008 |
| FR | 2965011 A1 | 3/2012 |
| FR | 2977632 A1 | 1/2013 |
| FR | 3004755 A1 | 10/2014 |
| FR | 3007068 | 12/2014 |
| GB | 174131 A | 1/1922 |
| GB | 1215148 A | 12/1970 |
| GB | 2537061 A | 10/2016 |
| JP | H0296212 A | 4/1990 |
| JP | H04365303 | 12/1992 |
| JP | H11159320 | 6/1999 |
| JP | 2001030093 A | 2/2001 |
| JP | 2004339991 A | 12/2004 |
| JP | 2005127271 A | 5/2005 |
| JP | 2005155404 A | 6/2005 |
| JP | 2005214175 | 8/2005 |
| JP | 2005273578 | 10/2005 |
| JP | 2006017043 | 1/2006 |
| JP | 2006167576 A | 6/2006 |
| JP | 2007000783 A | 1/2007 |
| JP | 2007000784 A | 1/2007 |
| JP | 2007040149 A | 2/2007 |
| JP | 2007073957 A | 3/2007 |
| JP | 2007115748 A | 5/2007 |
| JP | 2007146700 A | 6/2007 |
| JP | 2008014213 A | 1/2008 |
| JP | 2009002213 A | 1/2009 |
| JP | 2009030560 A | 2/2009 |
| JP | 2009114910 A | 5/2009 |
| JP | 2009156068 A | 7/2009 |
| JP | 2009156069 A | 7/2009 |
| JP | 2009167806 A | 7/2009 |
| JP | 2009209822 A | 9/2009 |
| JP | 5066435 | 11/2012 |
| JP | 5114219 B2 | 1/2013 |
| JP | 2013002367 A | 1/2013 |
| JP | 2014095367 A | 5/2014 |
| JP | 2016188579 A | 11/2016 |
| KR | 100679716 B1 | 1/2007 |
| KR | 20090105593 A | 10/2009 |
| KR | 102013086287 A | 4/2010 |
| KR | 20110049152 A | 5/2011 |
| KR | 10-2014-0002326 | 1/2014 |
| SE | 8200991 L | 8/1983 |
| SE | 531199 C2 | 1/2009 |
| WO | 2004113690 A1 | 12/2004 |
| WO | 2008034981 A1 | 3/2008 |
| WO | 2008049757 A1 | 5/2008 |
| WO | 2008122724 A1 | 10/2008 |
| WO | 2009012819 A1 | 1/2009 |
| WO | 2009024815 A2 | 2/2009 |
| WO | 2009030858 A1 | 3/2009 |
| WO | 2009098096 A1 | 8/2009 |
| WO | 2009127449 | 10/2009 |
| WO | 2010055239 A1 | 5/2010 |
| WO | 2010149410 A1 | 12/2010 |
| WO | 2011110885 A1 | 9/2011 |

(56)    References Cited

FOREIGN PATENT DOCUMENTS

| | | |
|---|---|---|
| WO | 2012052560 A1 | 4/2012 |
| WO | 2012120000 A1 | 9/2012 |
| WO | 2013004517 A2 | 1/2013 |
| WO | 2013010700 A1 | 1/2013 |
| WO | 2013035112 A1 | 3/2013 |
| WO | 2013099312 A1 | 7/2013 |
| WO | 2013099313 A1 | 7/2013 |
| WO | 2014098728 | 6/2014 |
| WO | 2015012829 A1 | 1/2015 |
| WO | 2015018849 A1 | 2/2015 |
| WO | 2015076765 A1 | 5/2015 |
| WO | 2015105500 A1 | 7/2015 |
| WO | 2015130640 A1 | 9/2015 |
| WO | 2015151282 A1 | 10/2015 |
| WO | 2016013319 A1 | 1/2016 |
| WO | 2016036298 | 3/2016 |
| WO | 2016158993 A1 | 10/2016 |
| WO | 2017054179 A1 | 4/2017 |
| WO | 2017084549 A1 | 5/2017 |
| WO | 2017102813 A2 | 6/2017 |
| WO | 2018054490 A1 | 3/2018 |

\* cited by examiner

HEATED DOSING MIXER

BACKGROUND OF THE INVENTION

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. A mixer is positioned upstream of the SCR catalyst and mixes engine exhaust gases and products of urea transformation. The injection system includes a doser that sprays the fluid into the exhaust stream. The fluid spray should be transformed as much as possible into ammonia ($NH_3$) before reaching the SCR catalyst.

Providing for ultra-low NOx emissions requires dosing at low temperatures to address reducing emissions at cold start and low load cycles. Dosing DEF at low temperatures is a thermolysis and deposit formation problem as there is insufficient heat. Some configurations require ammonia dosing by converting DEF to ammonia prior to introduction into the mixer. This requires storing ammonia and/or heating DEF external to the mixer. This is disadvantageous from a packaging and cost perspective.

SUMMARY OF THE INVENTION

In one exemplary embodiment, a vehicle exhaust system has a mixer housing that includes a doser opening and defines an internal mixing chamber. A doser injects fluid into the mixer housing through the doser opening. A flow passage has an inlet end positioned adjacent the doser opening and an outlet end open to the mixing chamber. At least one heating device associated with the flow passage.

In a further embodiment of the above, the heating device is an electric coil that heats a surface of the flow passage.

In a further embodiment of any of the above, the heating device is a heated plate that heats a surface of the flow passage.

In a further embodiment of any of the above, the heating device is positioned at the outlet end of the flow passage.

In a further embodiment of any of the above, the heating device surrounds an outer surface of the flow passage.

In a further embodiment of any of the above, an inner surface of the flow passage surrounds the heating device.

In a further embodiment of any of the above, the system includes a control that selectively activates the heating device when a temperature of the exhaust gas is below a predetermined temperature.

In a further embodiment of any of the above, the system includes at least one temperature sensor that measures exhaust gas temperature prior to entering the mixing chamber.

In a further embodiment of any of the above, the heating device heats the flow passage such that all fluid injected by the doser evaporates prior to entering the mixing chamber.

In a further embodiment of any of the above, an amount of energy required to heat the flow passage is determined based on an amount of injected fluid and the temperature of the exhaust gas.

In a further embodiment of any of the above, the flow passage comprises a solid or porous body, and wherein the flow passage further comprises a cylindrical tube or cone.

In a further embodiment of any of the above, the base end of the flow passage is positioned adjacent the dose opening such that a gap is formed within the mixer housing between the base end of the flow passage and an inner surface of the mixer housing that surrounds the doser opening.

In a further embodiment of any of the above, exhaust gas is directed into the base end of the flow passage to mix with fluid sprayed into the base end of the flow passage such that a mixture of evaporated fluid and exhaust gas exits the outlet end of the flow passage.

In another exemplary embodiment, a vehicle exhaust system includes a mixer housing, a doser to inject fluid into the mixer housing through a doser opening in the mixer housing, and a flow passage comprising a solid or porous body that has an inlet end positioned adjacent the doser opening and an outlet end open to the mixing chamber. At least one heating device is positioned at the outlet end of the flow passage to heat the flow passage such that all fluid injected by the doser evaporates prior to entering the mixing chamber. The system also includes a control that selectively activates the heating device when a temperature of the exhaust gas is below a predetermined temperature.

In a further embodiment of any of the above, the heating device comprises an electric coil or heated plate, and the flow passage comprises a cylindrical tube or cone.

In another exemplary embodiment, a method for injecting a reducing agent into an exhaust component comprising the steps of: providing a mixer housing that defines an internal mixing chamber; providing a doser opening in the mixer housing; positioning a doser to inject fluid into the mixer housing through the doser opening; positioning a flow passage in the mixer housing such that an inlet end of the flow passage is positioned adjacent the doser opening and an outlet end of the flow passage is open to the mixing chamber; and using at least one heating device to heat the flow passage.

In a further embodiment of any of the above, the method includes heating the flow passage such that all fluid injected by the doser evaporates prior to entering the mixing chamber.

In a further embodiment of any of the above, the method includes selectively activating the heating device when a temperature of the exhaust gas is below a predetermined temperature.

These and other features of this application will be best understood from the following specification and drawings, the following of which is a brief description.

DETAILED DESCRIPTION

Figure 1:
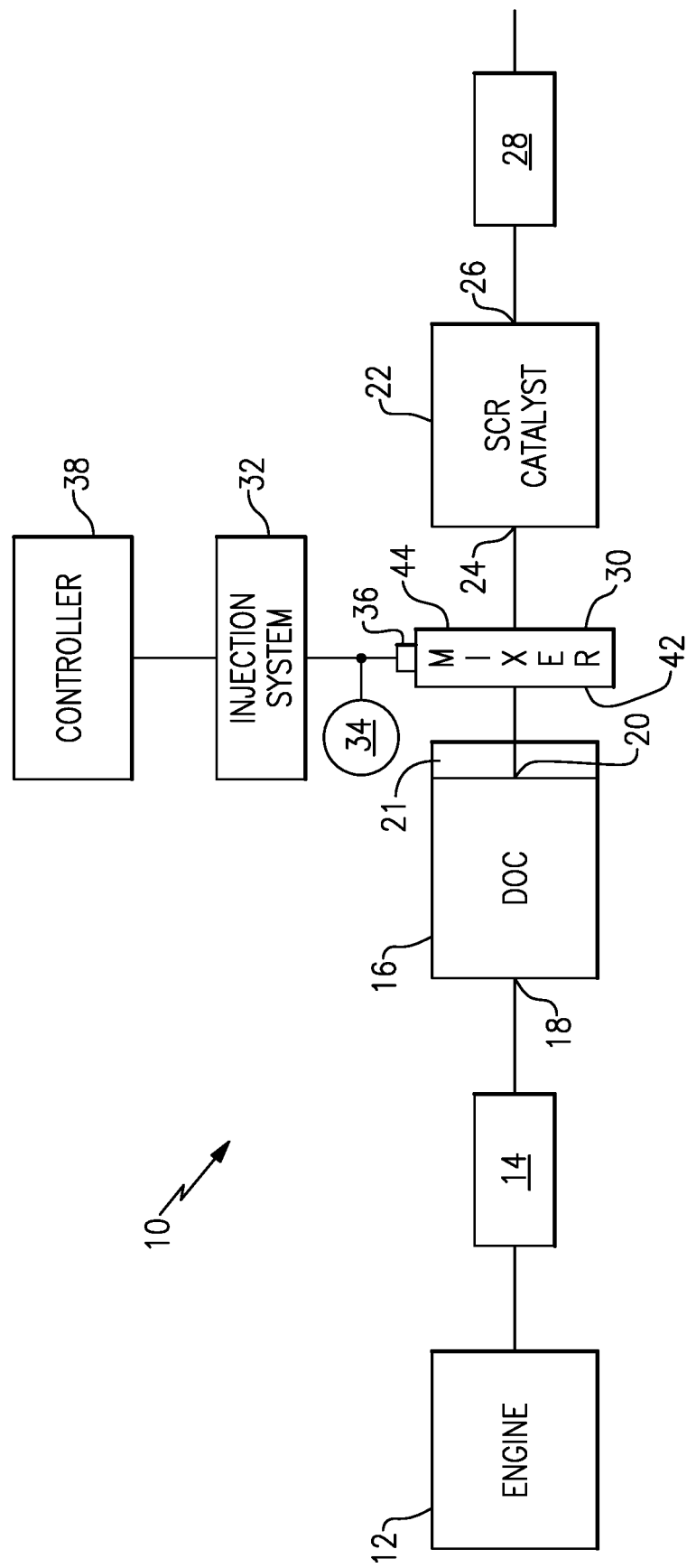
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust component 14 comprises at least one pipe that directs engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36 defining a doser axis A, and a controller 38 that controls injection of the urea as known.

The mixer 30 comprises a mixer housing 40 having an inlet end 42 configured to receive the engine exhaust gases and an outlet end 44 to direct a mixture of swirling engine exhaust gas and products transformed from urea to the SCR catalyst 22. Examples of a mixer 30 that can be used in the exhaust system 10 can be found in U.S. Pat. Nos. 8,661,792 and 9,266,075 for example, which are also assigned to the assignee of the present application and are hereby incorporated by reference.

Figure 2:
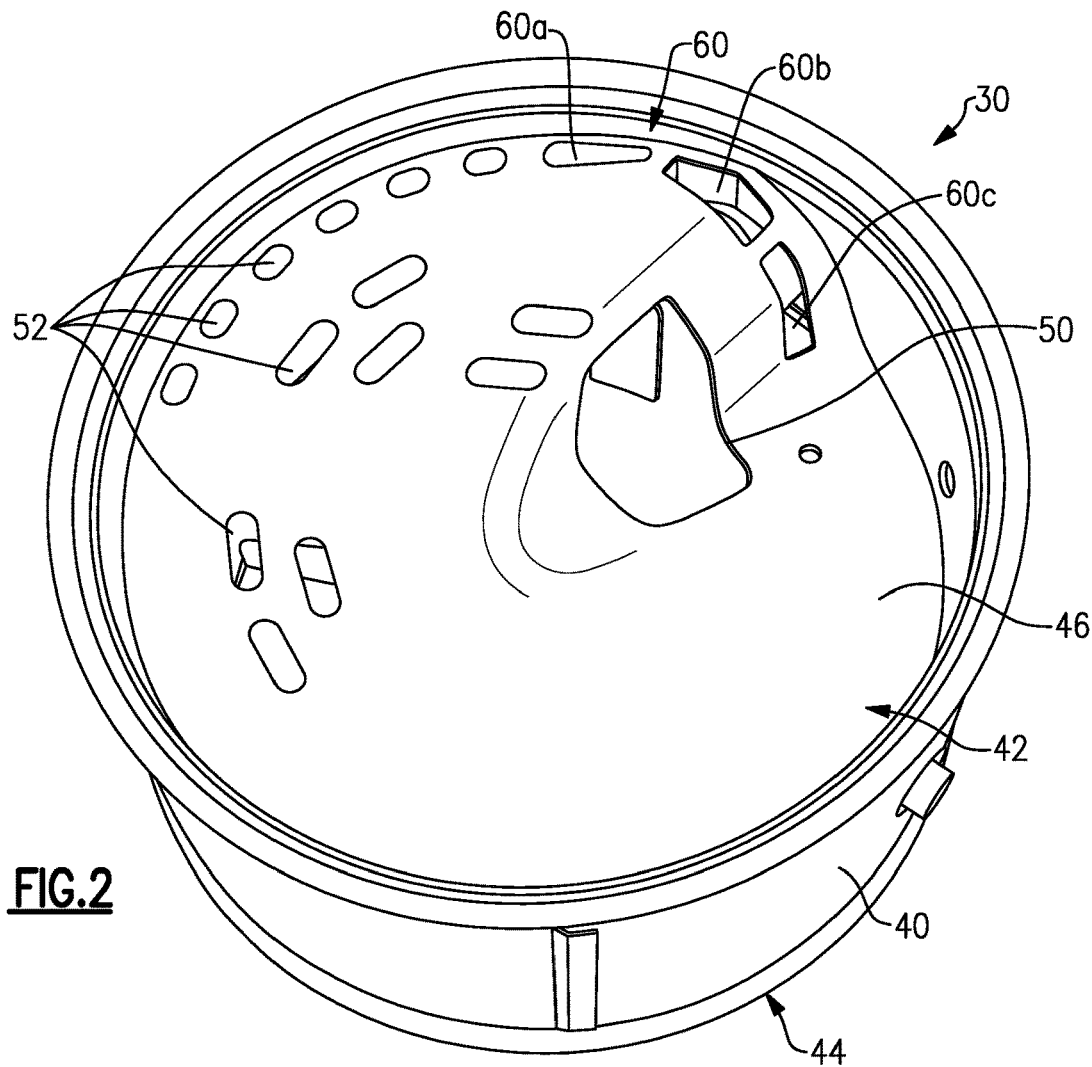
FIG. 2 is an inlet end view of the mixer.
Figure 3:
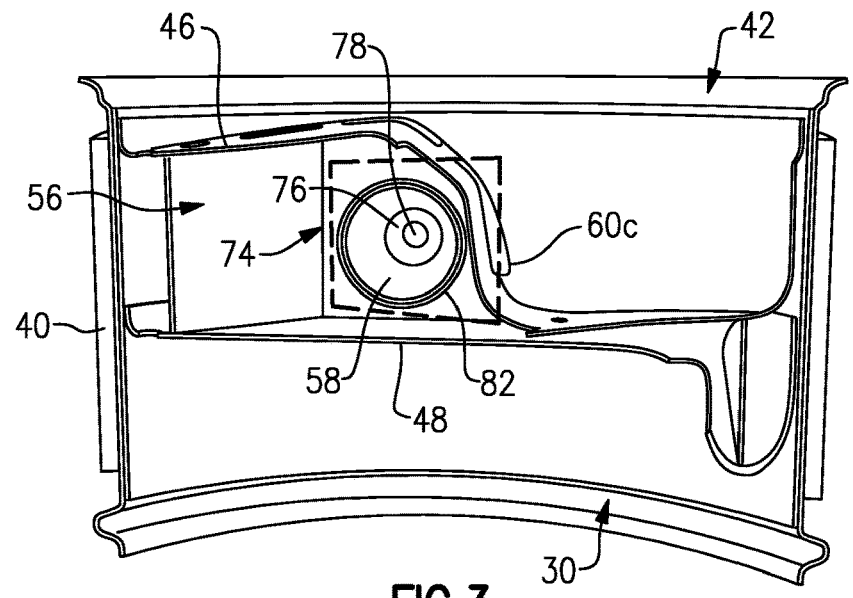
FIG. 3 is a section view of the mixer of FIG. 2.

FIGS. 2-3 show one example of a mixer 30 that includes an inlet baffle 46 and an outlet baffle 48. The inlet baffle 46 is at the upstream or inlet end 42 of the mixer 30. The inlet baffle 46 is configured to initiate swirling of the primary exhaust gas flow through the mixer 30. In one example, the inlet baffle 46 includes at least one large inlet opening 50 (FIG. 2) that receives the majority of the exhaust gas, and which is configured to initiate the swirling motion. The inlet baffle 46 also includes a plurality of perforations, slots, or additional inlet openings 52 that ensure optimal homogenization of exhaust gases and reduces back pressure.

The inlet 46 and outlet 48 baffles are fixed to the mixer housing 40 which defines an internal mixing chamber 56 between the inlet 46 and outlet 48 baffles. Exhaust gas and injected fluid spray, which is injected via the doser 36, are mixed within the mixing chamber 56. Positioned within the mixing chamber 56 is a flow passage 58 (FIG. 3). In one example, the flow passage 58 comprises a tube, cone, or other similar structure that is positioned within the mixing chamber 56, which is enclosed by the mixer housing 40 and the inlet 46 and outlet 48 baffles. The flow passage 58 protects the injected spray from direct impingement of exhaust flow entering the mixing chamber 56 via the primary opening 50 of the inlet baffle 46. In one example, the flow passage 58 comprises a variable geometry flow diverting passage.

In addition to the primary inlet opening 50 and the secondary openings 52, the inlet baffle 46 also includes one or more openings 60 that direct a small portion of exhaust gas away from the primary flow path and toward an outer surface 62 of the flow passage 58. In one example, three openings 60a, 60b, 60c are used to direct exhaust gas toward the outer surface 62 of the flow passage 58. The openings 60a, 60b, 60c are spaced apart from each other about an outer peripheral edge of the inlet baffle 46.

Figure 4:
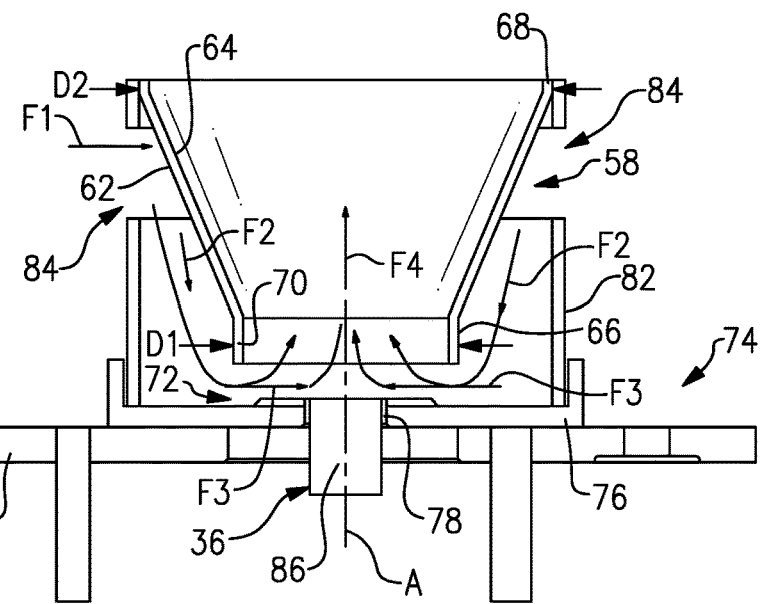
FIG. 4 is a schematic side cross-sectional view of a flow passage as used in a doser sub-assembly.

FIG. 4 shows one example of the flow passage 58 in greater detail. In this example, the flow passage 58 comprises a cone that has an outer surface 62 and an inner surface 64. The flow passage 58 has a base end 66 and extends to a distal end 68 that is defined by a diameter that is greater than a diameter of the base end 66. The base end 66 comprises a tubular section 70 of a generally constant diameter D1 and the distal end 68 is defined by a diameter D2 that is greater than D1. Optionally, a reverse configuration can have the inlet end with a larger diameter than the outlet end. The inner 64 and outer 62 surfaces of the flow passage 58 taper outwardly from the tubular section 70 to the distal end 68. In one example, the flow passage 58 is concentric with the doser axis A. In one example, the flow passage 58 may also having a continuously increasing taper from the base end 66 to the distal end 68.

The exhaust gas is directed to enter the base end 66 of the flow passage 58 in an evenly distributed manner about a gap 72 between the base end 66 and an inner surface of the mixer housing 40. A doser sub-assembly 74 is mounted to align with the doser axis A at the base end 66 of the flow passage 58. The doser sub-assembly 74 includes a plate 76 with an opening 78 that aligns with an opening in the mixer housing 40. A doser mount structure 80 abuts against the plate 76 and holds the doser 36. The doser sub-assembly 74 includes a cylindrical housing or sleeve 82 with one or more openings 84.

As shown in FIG. 4, the doser 36 includes a doser tip 86 that is configured to spray the reducing agent into the mixer 30 through the opening 78. The base end 66 of the flow passage 58 is positioned adjacent the opening 78 such that the gap 72 is formed within the doser sub-assembly 74 around the doser tip 86. Exhaust gas is directed to enter the base end 66 of the flow passage 58 through the annular gap 72 in a direction transverse to the doser axis A.

In one example, the sleeve 82 is fixed to the plate 76 and surrounds at least a portion of the flow passage 58. The openings 84 of the sleeve 82 direct exhaust gas in a first flow direction F1 against the outer surface 62 of the flow passage 58. The exhaust gas then flows in a second flow direction F2 along the outer surface 62 of the flow passage 58 toward the base end 66. The exhaust gas then flows in a third flow direction F3 to enter the annular gap 72 extending circumferentially around the base end 66. After flowing through the annular gap 72, the exhaust gas flows in a fourth flow direction F4 where it mixes with the reducing agent and to exits the flow passage 58 at the distal end 68. In one example, the fourth flow direction F4 extends generally along the doser axis A and is opposite of the second flow direction F2. Further, the third flow direction F3 is perpendicular to the fourth flow direction F4.

As shown in FIG. 3, the doser sub-assembly 74 is positioned between the inlet baffle 46 and outlet baffle 48 of the mixer 30. The openings 60 in the inlet baffle 46 and the openings 84 in the sleeve 82 facilitate an even distribution of the gas around the base of the flow passage 58 (FIG. 4) such that an evenly distributed flow enters the annular gap 72. In one example, the openings 84 are spaced circumferentially about the cylindrical body of the sleeve 82.

Figure 7:
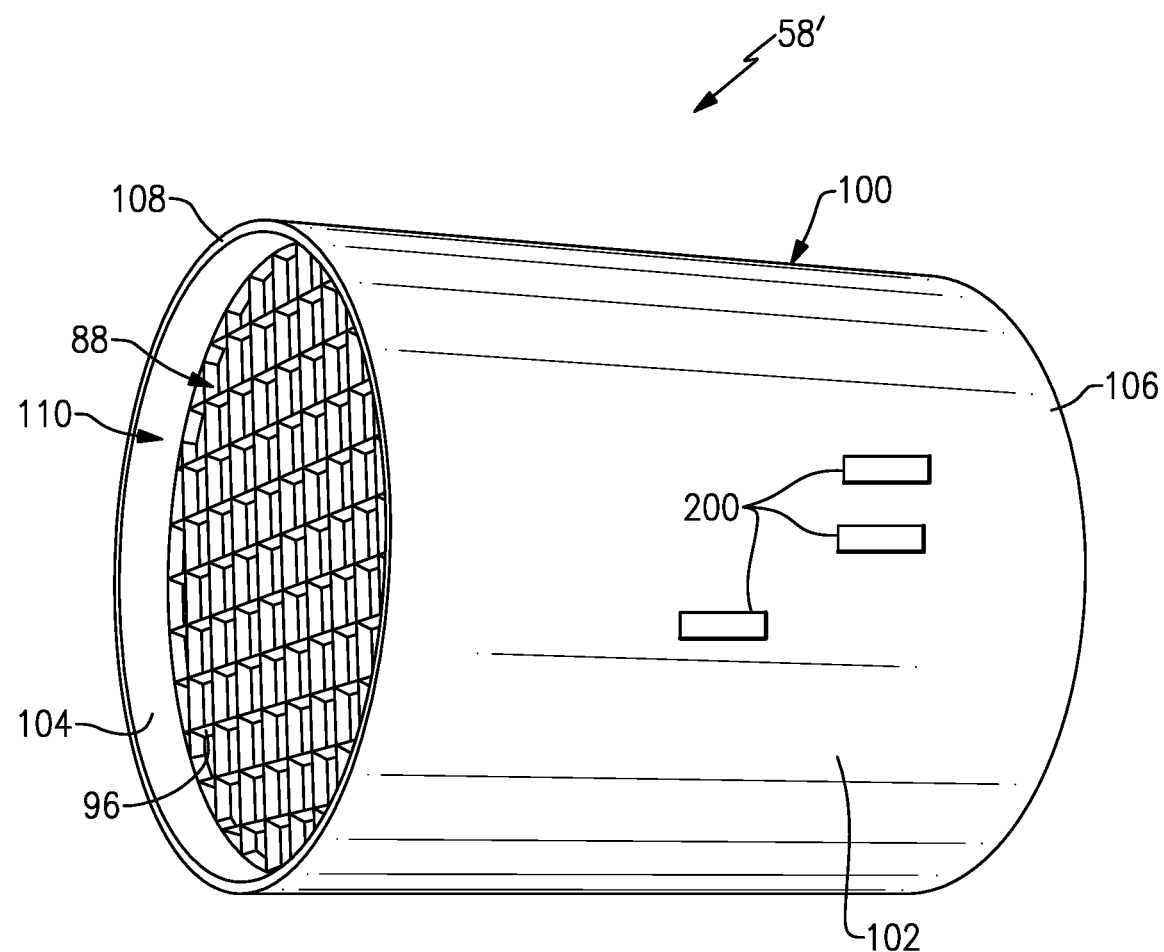
FIG. 7 is another example of a flow passage with a heating device.

In another example shown in FIG. 7, a flow passage 58' comprises a cylindrical tube 100 that has an outer surface 102 and an inner surface 104. The flow passage 58' has a base end 106 and extends to a distal end 108 such that the tube 100 is defined by a constant diameter. In one example, the flow passage 58' is concentric with the doser axis A. The flow passage 58 is positioned within the mixing chamber 56 in manner similar to that described above with regard to the flow passage 58 that comprises a cone such that exhaust gas is evenly distributed around the base end 106 of the flow passage 58'.

Figure 5:
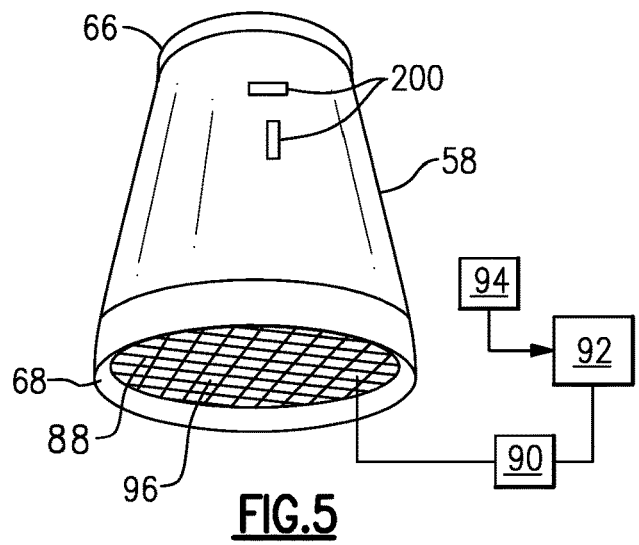
FIG. 5 is one example of a flow passage with a heating device as used with the mixer of FIG. 2.
Figure 6:
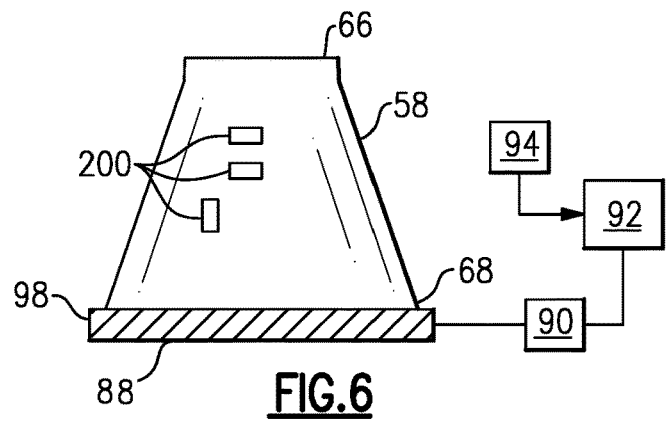
FIG. 6 is another example of a flow passage with a heating device.

In each of these examples, the flow passage 58, 58' comprises a solid structure or body that extends completely about the axis A. However, the flow passages 58, 58' may optionally include one or more slots 200 (FIGS. 5-7) for discrete amounts of exhaust gas to enter the flow passage to mix with the injected fluid and exhaust gas entering the inlet end of the flow passage 58, 58'. The slots 200 can have different shapes and/or sizes and can be positioned in any pattern to provide an optimum mixing configuration. In another example, instead of comprising a solid body, the flow passage 58, 58' can comprise a porous structure such as a metal mesh.

The doser 36 sprays the fluid into the flow passage 58 to mix with the exhaust gas entering via the gap 72. The fluid should be transformed as much as possible into ammonia (NH$_3$) before exiting the mixer 30 and reaching the SCR catalyst 22. However, dosing at low temperatures has a tendency to create a deposits as there is insufficient heat to evaporate the fluid spray injected by the doser 36.

In order to address this problem, the subject invention provides at least one heating device 88 that is associated with the flow passage 58. The heating device 88 is connected to a power supply 90 and a control 92 selectively activates the heating device 88 when a temperature of the exhaust gas is below a predetermined temperature. The control 92 can be a dedicated electronic control unit, or can be part of the controller 38 for the injection system 32, or can be incorporated into another electronic control unit in the vehicle. One or more temperature sensors 94 can be used to measure exhaust gas temperature prior to entering the mixing chamber 56. The sensors 94 communicate data to the control 92. Typically, the control 92 activates the heating device 88 under cold start or low load conditions, for example. The heating device 88 heats the flow passage 58, 58' such that all fluid spray injected by the doser 36 evaporates prior to exiting the flow passage 58, 58' and entering the mixing chamber 56. In one example, an amount of energy required to heat the flow passage 58, 58' is determined based on an amount of injected fluid and the temperature of the exhaust gas.

In one example (FIG. 5), the heating device 88 is a heated plate 96 that heats a surface of the flow passage 58. The plate 96 is positioned within the flow passage 58 near the distal end 68, for example, such that the flow passage 58 completely surrounds the plate 96. The plate 96 can comprise a grid configuration or include multiple perforations/openings such that the ammonia/exhaust gas mixture can exit the flow passage 58 and enter the swirling flow pattern generated by the mixer 30. The swirling gas mixture then exits the mixer 30 via openings in the outlet baffle 48 and is directed toward the SCR catalyst 22.

In another example (FIG. 6), the heating device 88 is an electric coil 98 that heats a surface of the flow passage 58. The coil 98 is positioned at the outlet or distal end 68 of the flow passage 58. In one example, the coil 98 completely surrounds the outer surface 62 of the flow passage 58 at the distal end 68.

In another example (FIG. 7), the heating device 88 is positioned within an inner cavity 110 defined by the tube 100. The heating device 88 can be positioned at or near the distal end 108, for example. In this example, the heating 88 device comprises the heated plate 96, however, the device could also comprise a coil 98 positioned within or surrounding the tube 100.

In each example, the control 92 activates the plate 96 or coil 98 to heat the flow passage 58 to ensure that all fluid spray injected by the doser 36 evaporates prior to exiting the flow passage 58 and entering the mixing chamber 56. The plate 96 and coil 98 are examples of heating devices 88 that can be used to heat the flow passage 58; however, other types of heating devices could also be used.

As discussed above, the SCR device 22 is used to reduce NOx emissions by using ammonia (NH3) as the catalytic reductant. NH3 is injected as DEF fluid using the doser 36. The catalytic reduction is based on the ammonia decomposition and SCR activation; however, both of these have difficulty occurring at lower temperatures. The first step in ammonia decomposition is to evaporate the water in the DEF fluid, which is a process referred to as thermolysis, i.e. the breakdown of molecules by the action of heat. During the process of mixing, the DEF fluid takes this energy from the exhaust heat. At lower temperatures, the exhaust does not have enough energy, and the water does not evaporate completely which can result in significant deposit formation. This therefore limits the ability to dose at lower temperatures and the NOx produced by the exhaust system can pass to the tail pipe untreated.

The subject invention enables dosing of DEF fluid at lower temperatures by using the heating device 88 to heat surfaces in the mixer to help with the decomposition process when the exhaust gas energy itself is not sufficient to complete the process. The DEF spray impinges on the heated surfaces, which causes the water in the spray to evaporate before it can enter the mixing chamber thereby significantly reducing deposit formation. The amount of energy required to heat the surfaces is based on the amount of DEF injected and energy available in the exhaust. It is also essential that some exhaust gas flows through the heated surface along with the DEF at all times. This helps the heated surface from overheating.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A vehicle exhaust system comprising:
   a mixer housing defining an internal mixing chamber, wherein the mixer housing includes a doser opening;
   an inlet baffle and an outlet baffle positioned within the mixer housing with the internal mixing chamber being positioned between the inlet and the outlet baffles, and wherein the doser opening is formed in the mixer housing between the inlet and outlet baffles;
   a doser to inject fluid into the mixer housing through the doser opening, wherein the fluid includes at least urea and water;

a flow passage having an inlet end positioned adjacent the doser opening and an outlet end open to the mixing chamber, and wherein the flow passage is positioned within the internal mixing chamber between the inlet and outlet baffles; and at least one heating device associated with the flow passage.

2. The vehicle exhaust system according to claim 1 wherein the at least one heating device is an electric coil that heats a surface of the flow passage.

3. The vehicle exhaust system according to claim 1 wherein the flow passage comprises a cylindrical tube or cone, and wherein the inlet baffle includes at least one main inlet opening that receives a majority of exhaust gas entering the mixer housing and at least one additional opening that directs a portion of exhaust gas toward an outer surface of the flow passage.

4. The vehicle exhaust system according to claim 1 wherein the flow passage comprises a cylindrical tube or cone, and wherein the heating device heats a surface of the flow passage.

5. The vehicle exhaust system according to claim 1 wherein the flow passage comprises a solid or porous body, and wherein the flow passage comprises a cylindrical tube or cone.

6. The vehicle exhaust system according to claim 5 wherein the flow passage extends from a base end to a distal end, and wherein the base end of the flow passage is positioned adjacent the doser opening such that a gap is formed within the mixer housing between the base end of the flow passage and an inner surface of the mixer housing that surrounds the doser opening.

7. The vehicle exhaust system according to claim 6 wherein exhaust gas is directed into the base end of the flow passage to mix with fluid sprayed into the base end of the flow passage such that a mixture of evaporated fluid and exhaust gas exits the outlet end of the flow passage.

8. The vehicle exhaust system according to claim 1 wherein the at least one heating device is positioned at the outlet end of the flow passage.

9. The vehicle exhaust system according to claim 8 wherein the at least one heating device surrounds an outer surface of the flow passage.

10. The vehicle exhaust system according to claim 8 wherein an inner surface of the flow passage surrounds the at least one heating device.

11. The vehicle exhaust system according to claim 1 including a control that selectively activates the at least one heating device when a temperature of the exhaust gas is below a predetermined temperature.

12. The vehicle exhaust system according to claim 11 including at least one temperature sensor that measures exhaust gas temperature prior to entering the mixing chamber.

13. The vehicle exhaust system according to claim 11 wherein the at least one heating device heats the flow passage such that all fluid injected by the doser evaporates prior to entering the mixing chamber.

14. The vehicle exhaust system according to claim 11 wherein an amount of energy required to heat the flow passage is determined by the control based on an amount of injected fluid and the temperature of the exhaust gas.

15. A vehicle exhaust system comprising:
a mixer housing defining an internal mixing chamber, wherein the mixer housing includes a doser opening;
a doser to inject fluid into the mixer housing through the doser opening;

a flow passage having an inlet end positioned adjacent the doser opening and an outlet end open to the mixing chamber; and at least one heating device associated with the flow passage, wherein the at least one heating device is a heated plate that heats a surface of the flow passage.

16. A vehicle exhaust system comprising:
a mixer housing defining an internal mixing chamber, wherein the mixer housing includes a doser opening;
an inlet baffle and an outlet baffle positioned within the mixer housing with the internal mixing chamber being positioned between the inlet and the outlet baffles, and wherein the doser opening is formed in the mixer housing between the inlet and outlet baffles;
a doser to inject fluid into the mixer housing through the doser opening, wherein the fluid includes at least urea and water;
a flow passage comprising a solid or porous body that has an inlet end positioned adjacent the doser opening and an outlet end open to the mixing chamber, and wherein the flow passage is positioned within the internal mixing chamber between the inlet and outlet baffles;
at least one heating device positioned at the outlet end of the flow passage to heat the flow passage such that all fluid injected by the doser evaporates prior to entering the mixing chamber; and
a control that selectively activates the at least one heating device when a temperature of the exhaust gas is below a predetermined temperature.

17. The vehicle exhaust system according to claim 16 wherein the at least one heating device comprises an electric coil or heated plate, and wherein the flow passage comprises a cylindrical tube or cone.

18. The vehicle exhaust system according to claim 16 wherein the flow passage comprises a cylindrical tube or cone, and wherein
the inlet baffle includes at least one main inlet opening that receives a majority of exhaust gas entering the mixer housing and at least one additional opening that directs a portion of exhaust gas toward an outer surface of the flow passage, or
wherein the heating device heats a surface of the flow passage.

19. A method for injecting a reducing agent into an exhaust component comprising the steps of:
providing a mixer housing that defines an internal mixing chamber, and positioning an inlet baffle and an outlet baffle within the mixer housing with the internal mixing chamber being positioned between the inlet and the outlet baffles;
providing a doser opening in the mixer housing between the inlet and outlet baffles;
positioning a doser to inject fluid into the mixer housing through the doser opening, wherein the fluid includes at least urea and water;
positioning a flow passage in the mixer housing such that an inlet end of the flow passage is positioned adjacent the doser opening and an outlet end of the flow passage is open to the mixing chamber;
positioning the flow passage within the internal mixing chamber between the inlet an outlet baffles and; and
using at least one heating device to heat the flow passage.

20. The method according to claim 19 wherein the flow passage comprises a cylindrical tube or cone, and including
providing the inlet baffle with at least one main inlet opening that receives a majority of exhaust gas entering the mixer housing and at least one additional opening that directs a portion of exhaust gas toward an outer surface of the flow passage, or using the heating device to heat a surface of the flow passage.

21. The method according to claim 19 including heating the flow passage such that all fluid injected by the doser evaporates prior to entering the mixing chamber.

22. The method according to claim 21 including selectively activating the at least one heating device when a temperature of the exhaust gas is below a predetermined temperature.

* * * * *